July 11, 1933.  W. A. RUSH  1,917,665

SYSTEM OF SELECTIVE ROAD ILLUMINATION FOR AUTOMOBILES

Filed Feb. 9, 1931  3 Sheets-Sheet 1

Inventor
W. A. Rush

By Emil F. Lange
Attorney

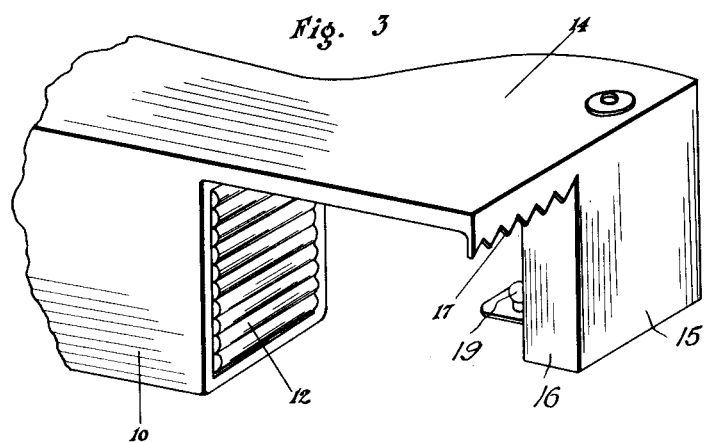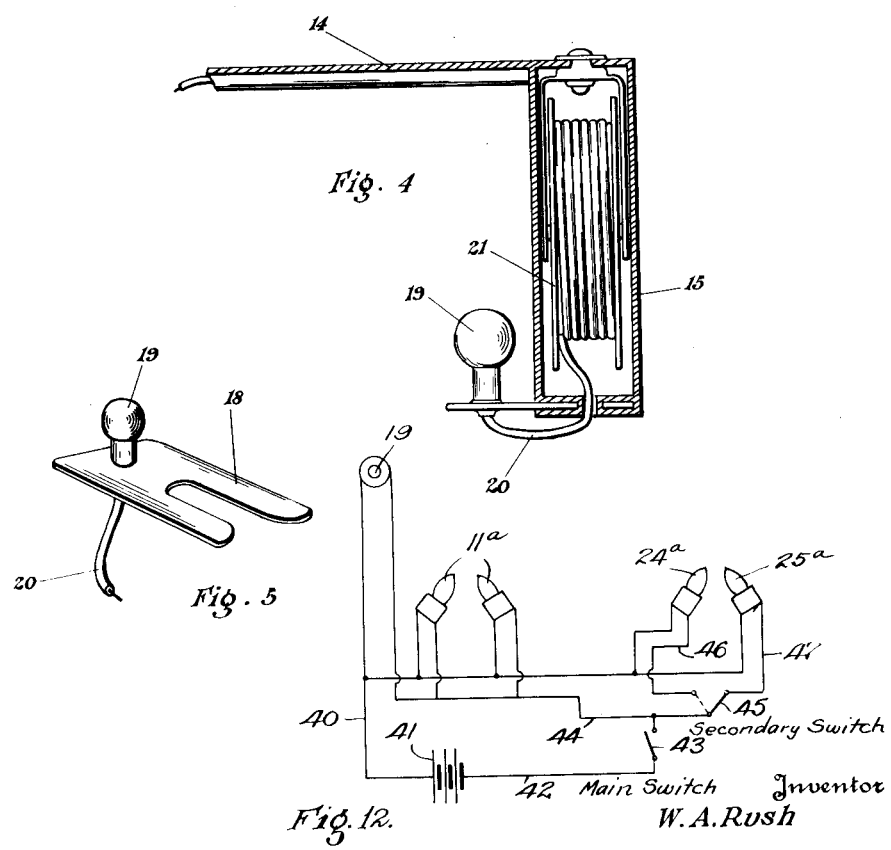

July 11, 1933. W. A. RUSH 1,917,665
SYSTEM OF SELECTIVE ROAD ILLUMINATION FOR AUTOMOBILES
Filed Feb. 9, 1931 3 Sheets-Sheet 3
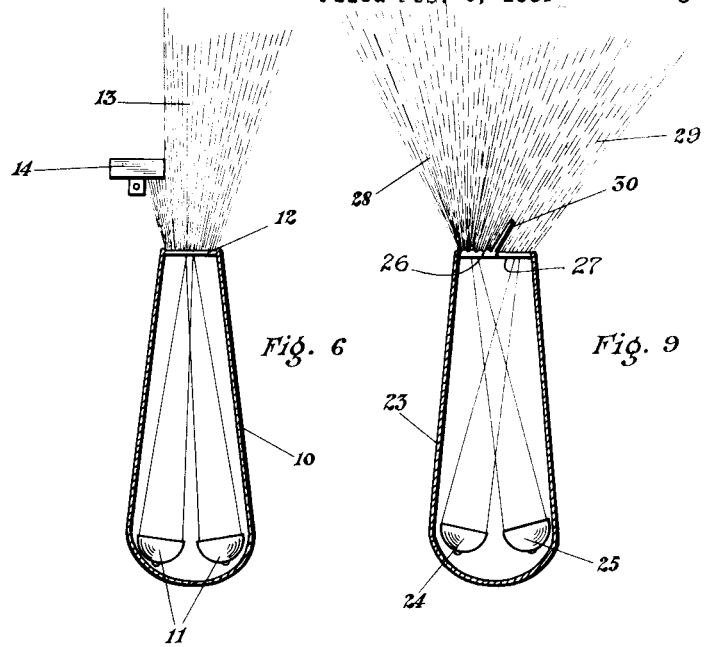
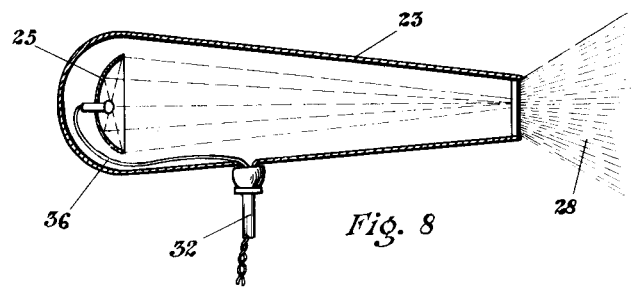
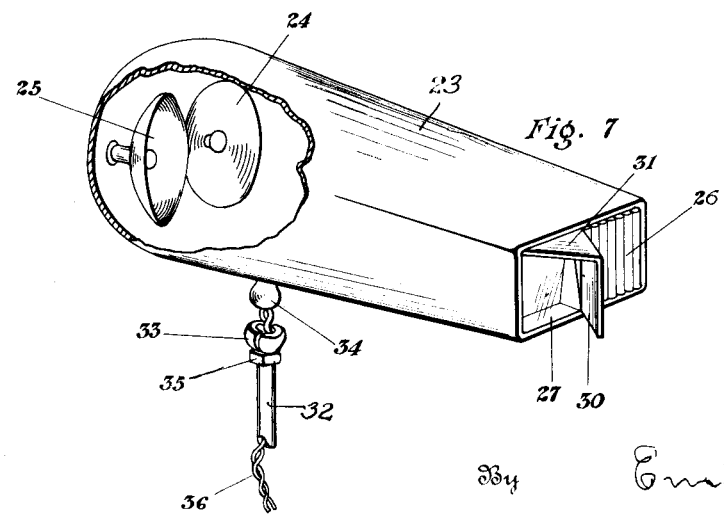
Inventor
W. A. Rush
By Emil F. Lange
Attorney Patented July 11, 1933

1,917,665

UNITED STATES PATENT OFFICE

WEAVER A. RUSH, OF BEATRICE, NEBRASKA

SYSTEM OF SELECTIVE ROAD ILLUMINATION FOR AUTOMOBILES

Application filed February 9, 1931. Serial No. 514,546.

My invention relates to a system of selective illumination, the object being to provide a lighting system for automobiles which will efficiently, adequately and correctly illuminate the highway under all of the conditions ordinarily encountered when driving at night.

Another of my objects is the provision of a lighting system in which the light of maximum intensity will fall upon the right-hand half of the highway including the ditch and all other objects immediately to the right of the road proper.

Another of my objects is the provision of a lighting system which provides a safe passing light for fully illuminating the right-hand half of the road, for leaving the left-hand side of the road in darkness, for fully illuminating the ditch and other objects to the right of the road proper and for eliminating glare.

Another of my objects is the provision of a lighting system which may be used when passing another car in a manner such that the road directly ahead is brilliantly illuminated while that portion of the road at the left is unilluminated and in comparative darkness with a very sharp division line between the illuminated and unilluminated portions of the road.

Another object of the invention is the provision of shields in combination with illuminating members so that the shields are interposed between the illuminating members and the eyes of the driver of an approaching car to thereby eliminate entirely all glare which would tend to confuse the driver of the approaching car.

It is also my object to provide means for illuminating the forward parts of the car of which my illumination system is a part so as to make the forward parts of the car fully visible to the driver of an approaching car, thus providing an added measure of safety.

Another object which I have in view is the provision of a lighting system in which the parts are of simple but sturdy construction, inexpensive to construct, and arranged so that they will lend themselves to attractive designs in modeling the shell or casing that encloses them.

Having in view these objects and others which will be pointed out in the following description, I will now refer to the drawings, in which Figure 1 is a view in perspective of the left-hand lamp assembly, parts being shown broken away to disclose parts which would otherwise be concealed.

Figure 2 is a plan view of the left-hand lamp assembly.

Figure 3 is a view in perspective of the forward and outer corner portion of the left-hand lamp assembly.

Figure 4 is a view in vertical section showing the lamp which illuminates the front portion of the automobile and showing also the cable and reel assembly.

Figure 5 is a perspective view of the lamp shown in Figure 4 and showing also the plate to which it is secured.

Figure 6 is another view in plan of the left-hand lamp assembly but with the top shield removed to better show the directions of the light rays.

Figure 7 is a perspective view of the right-hand lamp assembly.

Figure 8 is a vertical sectional view of the right-hand lamp assembly.

Figure 9 is a plan view of the right-hand lamp assembly with the parts removed to show the directions of the light rays.

Figure 12 is a diagrammatic view of the lamps and the circuit including the same showing the one manner of controlled illumination of the lamps.

Figure 10:
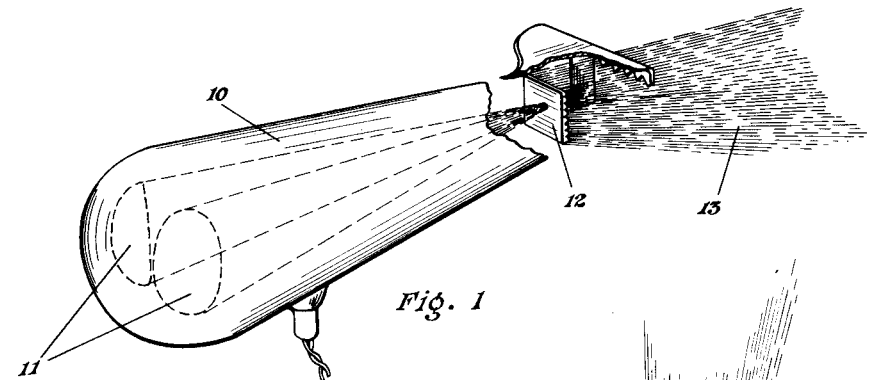
Figure 10 is a diagrammatic plan view of an automobile equipped with my illumination system which is adjusted for the illumination of the road during ordinary driving.

Referring now to Figures 1, 2 and 6 which show the left-hand lamp assembly, the numeral 10 designates the casing of this assembly. In the rear portion of this casing are two concave mirrors 11 each of which is provided with a source of light, such as an electric bulb, in a manner such that the two cones of light from the concave reflectors are brought to a common focus on the diffusing lens 12. The diffusing lens 12 is positioned in the forward open end of the casing 10 and in close proximity to the intersection of the two principal axes of the two mirrors 11. In each case of a mirror 11, its source of light and the diffusion lens 12 are positioned in the conjugate foci of the mirror. Adjustment of the two mirrors 11 must be made to bring the two cones of light to a common focus of the smallest diameter. With mirrors of the concave spherical type it is possible to reduce the diffusion lens 12 to a very small size of the cross sectional area of the bundle of rays at the apices of the cones of light. The diffusion lens 12 is composed of cylindrical lens elements which will diffuse the beams over an area best suited for road illumination. In the left-hand lamp assembly the diffusion lens 12 is placed with the cylindrical lens elements positioned horizontally so that the cross section of the beam of light rays 13 will be elliptical with the major axis vertical.

At the forward extremity of the casing 10 is a shield arrangement which is best shown in detail in Figure 3. This includes a horizontal forwardly projecting portion 14 and a shield 15 which cuts off some of the rays of light in the manner shown in Figures 2 and 10. The inner edge portion 16 of the shield intercepts the rays in the outer portion of the beam 13 so as to sharply define the illumination at the left of the car. In actual practice this illumination is so sharply defined that the illumination directly in front of the car is clear and intense while the road at the left-hand side and forward of the car remains unilluminated, therefore dark. The only rays of the beam 13 which are permitted to illuminate the road are those which pass to the right of the portion 16 of the shield. The forward end portion of the shield 14 is downturned and provided with a vignette 17 to prevent shadow distortion within the field illuminated by the forwardly projected beam 13.

Figure 11:
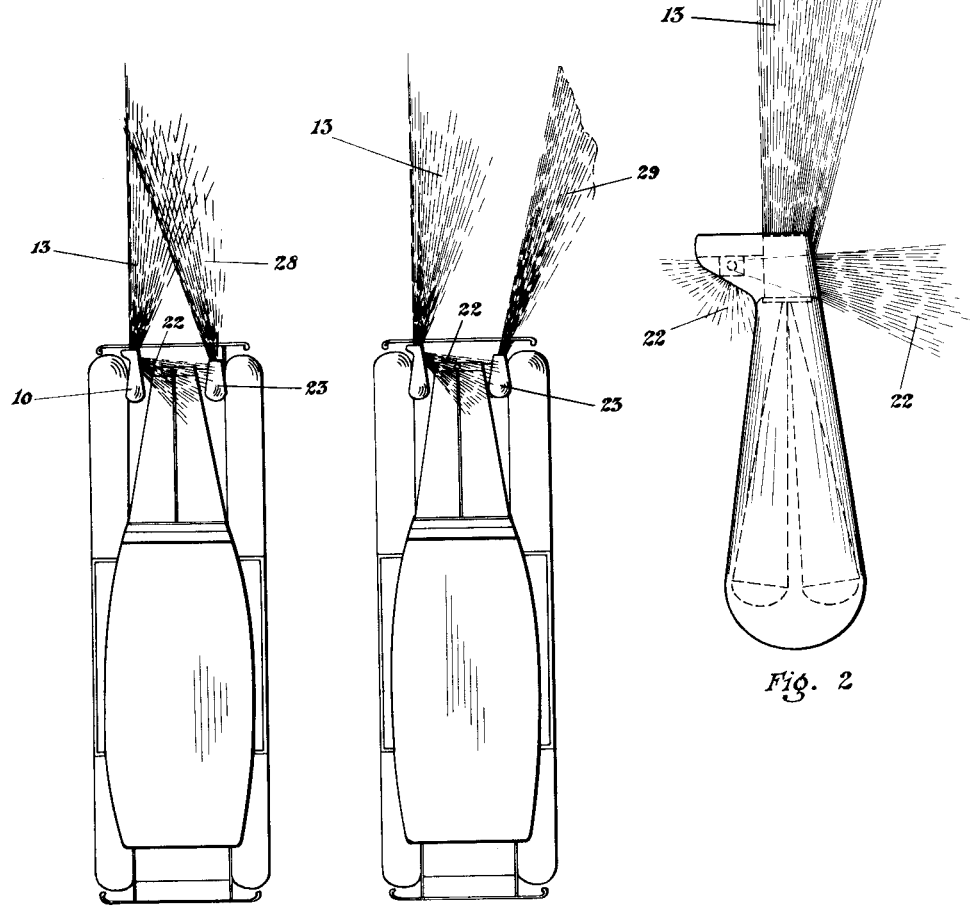
Figure 11 is a view similar to Figure 10 but showing the lights adjusted for passing another automobile going in the opposite direction.

The plate 18 has a bulb 19 secured thereto, the bulb receiving current through the conductor 20. The plate 18 is slidable into the socket formed in the lower portion of the shield 15 and the insulated conductor 20 passes through an opening in the lower wall of the shield 15 where it is wound upon a spool 21 within the casing of which the shield 15 is the forward wall. The spool 21 and the conductor 20 are completely insulated from the walls of the casing. In driving, the bulb 19 is designed to illuminate the front portions of the automobile as indicated by the cones 22 of light rays as shown in Figures 2, 10 and 11. The rays from the lamp 19 may pass unobstructed in all directions except upwardly where they are stopped by the top wall of the housing of which the shield 15 is the forward wall. They pass out laterally, downwardly and backwardly. The reel 21 with the extended cable 20 is provided for the purpose of utilizing the lamp 19 as a trouble lamp. The plate 18 may easily be withdrawn from its socket and it then makes a convenient handle for carrying the lamp to any part of the car. The reel and the cord may be connected up with the supply wire and the circuit may be completed by ground connection through the plate 18. This plate constitutes a shell which is so narrow that it does not obstruct rays that pass obliquely downward.

The right-hand lamp assembly has a casing 23 which is somewhat similar in appearance to the casing 10. Two reflectors 24 and 25 are secured within the casing 23, the reflectors 24 and 25 being similar to the reflectors 11. The forward open end of the casing 23 is provided on its left side with a diffusion lens 26 and on its right side with a prism 27. The cone of light from the reflector 24 is focused on the prism 27 while the cone of light from the reflector 25 is focused on the diffusion lens 26. This results in separate beams of light 28 and 29 which are kept separate by means of a shield 30, all of which is best shown in Figure 9. The diffusion lens 26 is similar to the diffusion lens 12 but it is positioned with the cylindrical ribs directed vertically so that the beam of light 28 is spread transversely to extend over almost the entire width of the road. The prism 27 is of a type which does not result in spectrum effects but it is designed to discharge the light rays forwardly and downwardly in the form of a beam. It should be noted that the bulbs in front of the reflectors 24 and 25 are so wired that either one or the other may be switched off without disturbing the other. In this way the beam of light rays 28 may be employed as shown in Figure 10 for road illumination or the beam of light rays 29 may be employed as shown in Figure 11 for the illumination of objects at the right-hand side of the road. When used for these purposes the deflecting shield 30 will sharply define either the beam 28 or the beam 29.

The two lamp assemblies are secured to the automobile in fixed position and placed in approximately the same positions occupied by the lamps at present in use. It is essential that they be placed at a level below the level of the eyes of the driver of an approaching car. It should be kept in mind that one of my main objects has been to avoid all glare which would confuse the driver of an approaching car. The horizontal shield 14 obstructs the view of the diffusion lens 12. Likewise the shield 30 is provided at its upper end with a horizontal wing 31 in the line of vision of the approaching driver so that he does not get the glare from the prism 27. When cars are passing each other the beam 28 is extinguished so that there is no glare from the diffusion lens 26 which thus requires no shield to protect the eyes of the driver of the approaching car. The lamps and reflectors are in no way visible and all of the illumination comes from the lenses 12 and 27. The light from the reflectors is focused in the diffusing lenses and on the prism 27 so that they are subject to considerable glare unless shielded. The diffusing lenses and the prism are constructed in the smallest possible size for producing adequate illumination since the reduction in size considerably reduces the amount of glare which must be shielded. With the ordinary spherical reflectors it is possible to reduce the area of the focus to about the size of a silver dollar and the diffusing lenses and prism may thus be made in extremely small sizes as compared with the lenses at present in use on automobiles.

The illumination is best indicated in Figures 10 and 11. In ordinary driving when no cars are approaching, the illumination is that shown in Figure 10. The beam 13 illuminates the entire right-hand side of the road up to and including the ditch at the right-hand side of the road. The beam 28 illuminates the left-hand side of the road, both sides of the road being thus adequately illuminated. The right-hand rays of the beam 13 strike the ditch at the right-hand side of the road at some distance forward of the car so that there is no danger whatever of the driver accidentally steering his car into the ditch. When another car is approaching a switch is turned to extinguish the cone 28 and to turn on the beam 29. The left-hand side of the road will then be left in darkness with a sharply defined line between the illuminated and the unilluminated portions of the road immediately in front of the left-hand side of the car so that the driver of the approaching car cannot possibly be confused by any glare. At the same time the beam 29 will illuminate the right-hand edge of the road including the ditch at the side of the road and this illumination will be relatively close to the front of the car as compared with the ditch illumination from the beam 13. The driver of the car will thus be enabled to keep away from the approaching car by so steering the car as to keep the left-hand side of the road in darkness. As long as he keeps the approaching car in the darkened portion of the road at the left, he is in no danger whatever of colliding with the approaching car. At the same time it is essential that he does not approach too closely the ditch at the right-hand side of the road. The intense illumination from the beam 29 will enable him to avoid the ditch. The driver of the approaching car is also enabled to prevent a collision by simply not steering his car into the beam of light 13. At the same time the driver of the approaching car sees the entire front of the car by means of the illumination from the cone 22 so that he can readily pass at a safe distance.

The minor features of my device are susceptible of numerous modifications. The casings 10 and 23 are shown as being almond-shaped but this is not an essential feature of the construction. This shape may easily be changed by designers to satisfy requriments of harmonizing with the l'nes of their car models. They are preferably made from sheet metal and they may be finished in any suitable color to harmonize with the color of the car. The structure for attaching the casings to the car and the connections for conducting the currents into the lamps are best shown in Figure 8 which shows the details of construction common to both lamp assemblies. The hollow standard 32 is provided with a split socket 33 for receiving a hollow ball 34 attached to the casing. The tightening of the nut 35 firmly secures the casing to the standard 32. The conductor 36 is thus entirely concealed. It is obvious, however, that a concealed conductor could be provided in others of numerous forms.

From the foregoing description it will be evident that the lighting system will solve all of the problems of road illumination for automobiles at present encountered in night driving. When the lights are in the position shown in Figure 10 the entire road from side to side is thoroughly illuminated, the brightest illumination being directly forward of the automobile with the illumination extending to some considerable distance ahead of the automobile. In the selective system which I have described, the beam of light 28 is cut off and the beam of light 29 is turned on when approaching an automobile which is passing in the opposite direction and on the left-hand side of the road. Everything to the left of the beam of light 13 is then unilluminated except for the illumination from the approaching car and the division line between the illuminated portion from the beam 13 and the unilluminated portion immediately at the left is very sharp. This sharp definition between the illuminated and the unilluminated portions of the road enables the drivers of both automobiles to pass each other in absolute safety. At the same time the beam of light 29 illuminates the right-hand side of the road to enable the driver of the automobile to avoid the ditch and all obstructions at the right-hand edge of the road.

As illustrating one possible way in which the lamps may be controlled and operated, reference is now made to Figure 12 wherein is shown the bulbs 11a disposed in the reflectors 11, and wherein the bulbs 24a and 25a are in their respective positions and are carried in the reflectors 24 and 25. In the diagram the automobile front illuminating bulb 19 is shown. All of these bulbs are connected at one side to a ground wire 40, which may be the frame of the automobile or the like, and which leads to a battery 41 from which extends a wire or lead 42. The wire 42 is connected through a main switch 43 with a distributing wire 44 which may lead directly to the lamps 19 and 11a, and which is connected by means of a secondary switch 45 to either one of branch wires 46 or 47 connected respectively to the bulbs 24a and 25a. Thus, when the main switch 43 is closed the lamps 19 and 11a are illuminated, and, depending upon the position of the secondary switch 45, either one of the bulbs 24a or 25a is illuminated when the vehicle is passing a second vehicle, the switch 45 may be swung into position shown in dotted lines in Figure 12 to throw the bulb 25a out of the circuit and extinguish it and at the same time illuminate the bulb 24a so that the beam 29 alone will be projected from the right hand lamp on the vehicle.

Road illumination for automobiles is at present limited by the intensity of the glare from the prisms which are at present used. These prisms are of relatively large size and they tend to confuse drivers who face them. The road is none too well illuminated but the objection to greater illumination with present systems is that it would increase the glare considerably beyond the danger point which has already been passed in the present systems. With my system, however, it is possible to very materially increase the intensity of illumination because the problem of glare has been entirely solved by the use of shields interposed between the illuminating units and the eyes of the drivers of approaching automobiles. It is thus possible to build up the illumination to any desired point.

Having thus described my invention in such full, clear, and exact terms that its construction and operation will be readily understood by others skilled in the art to which it pertains, what I claim as new and desire to secure by Letters Patent of the United States is:

1. A lamp support adapted for attachment to an automobile headlight to project forwardly therefrom, a lamp carrying plate detachably connected to said support and having an extended conductor whereby said lamp carrying plate may be moved to other parts of the automobile to serve as a trouble lamp, said support including an upper horizontal shield and a forward vertical shield whereby said lamp in its normal position illuminates the front of the automobile and whereby said lamp is invisible to the driver of an approaching automobile.

2. A lamp for illuminating the front of an automobile, comprising a bulb, an upper shield and a forward shield for concealing said bulb from the driver of an approaching automobile, a plate supporting the bulb adapted for detachable connection in the rear of said forward shield, a reel in the rear of said forward shield, and an electrical conductor for said bulb, said electrical conductor being adapted for winding on and unwinding from said reel to thereby adapt said bulb to function as a trouble lamp.

3. In a road illumination system for automobiles, a lamp, a dispersion lens for the lamp for illuminating the right-hand portion of the road, a second lamp, a second dispersion lens for the second lamp for illuminating the left-hand portion of the road, a third lamp, and a prism for the third lamp for illuminating the ditch at the right-hand side of the road, the lamps illuminating said second lens and said prism being operative only one at a time.

4. In a road illumination system for automobiles, a lighting unit adapted to be secured to an automobile at the right-hand forward corner thereof, said lighting unit including a lamp, a dispersion lens for the lamp directing a beam of light forwardly and downwardly to illuminate the major portion of the road, a second lamp, and a prism for the second lamp directing a beam of light forwardly and downwardly and toward the right to illuminate the right-hand edge of the road and the ditch adjacent thereto, the lamps illuminating said dispersion lens and said prism being selectively operable.

5. In a road illumination system for automobiles, a lighting unit adapted to be secured to an automobile at the right-hand forward corner thereof, said lighting unit including a lamp, a dispersion lens for the lamp directing a beam of light forwardly and downwardly to illuminate the major portion of the road, a second lamp, a prism for the second lamp directing a beam of light forwardly and downwardly and toward the right to illuminate the right-hand edge of the road and the ditch adjacent thereto, and a shield disposed forwardly of and between the lens and the prism for sharply defining the two beams of light, said lamp for the dispersion lens and said lamp for said prism being selectively operable.

In testimony whereof I affix my signature.

WEAVER A. RUSH.